Oct. 20, 1925.
C. J. BARNES
BAITING DEVICE FOR RODENTS
Filed April 13, 1925
1,558,426
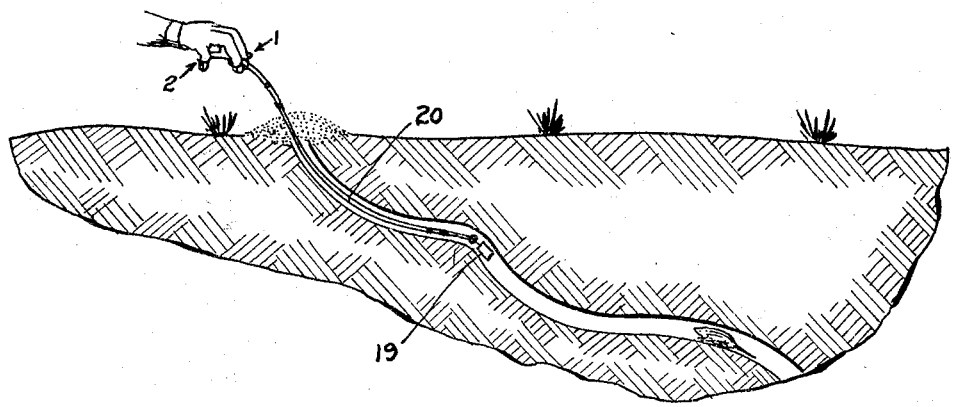
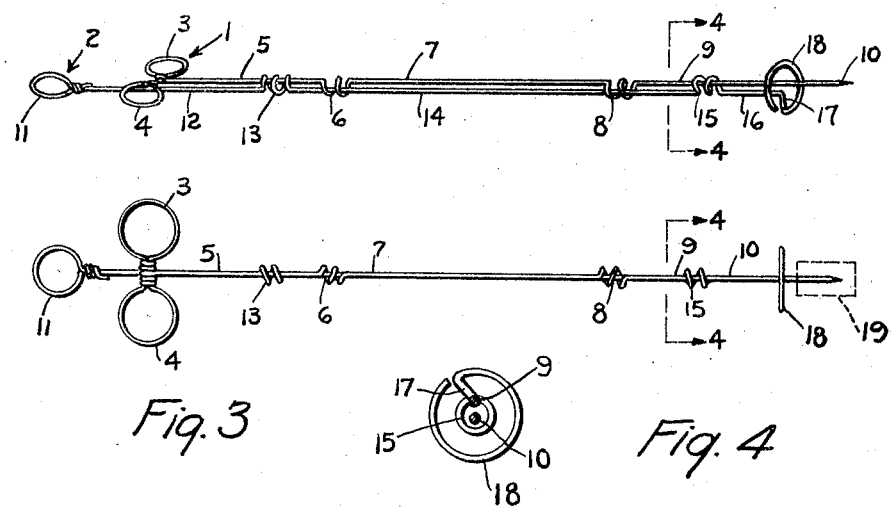
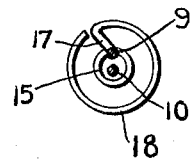
Inventor
Charles J. Barnes.
by: Hazard and Miller
Atty's.

Patented Oct. 20, 1925.

1,558,426

UNITED STATES PATENT OFFICE.

CHARLES J. BARNES, OF REDLANDS, CALIFORNIA.

BAITING DEVICE FOR RODENTS.

Application filed April 13, 1925. Serial No. 22,830.

*To all whom it may concern:*

Be it known that I, CHARLES J. BARNES, a citizen of the United States, residing at Redlands, in the county of San Bernardino and State of California, have invented new and useful Improvements in Baiting Devices for Rodents, of which the following is a specification.

This invention is a baiting device for rodents and consists of the novel features herein shown, described and claimed.

An object is to make a simple device for placing bait in a gopher hole or the like.

Other objects and advantages will appear from the drawings and specification. The drawings illustrate the invention.

Figure 1 is a fragmentary sectional elevation illustrating the operation of placing a bait in a gopher hole in accordance with the principles of my invention.

Fig. 2 is a perspective of the baiting device shown in Fig. 1.

Fig. 3 is a plan of the baiting device shown in Fig. 2.

Fig. 4 is a cross section on the lines 4—4 of Figs. 2 and 3.

The details of construction and operation are as follows:

The baiting device consists of a bait carrying member 1 and a bait expelling member 2.

The bait carrying member 1 is formed of a single wire and consists of finger loops 3 and 4 formed on one end of the wire, a spacing bar 5 extending from between the loops 3 and 4, a bearing coil 6 at the opposite end of the spacing bar 5 from the loops 3 and 4, a second spacing bar 7 extending from the coil 6, second bearing loops 8 at the opposite end of the bar 7 from the loops 6 and a straight prong 9 extending from the loops 8 and having a point 10.

The bait releasing member 2 comprises a finger loop 11, a spacing bar 12 extending from the loop 11, a bearing coil 13 upon the spacing bar 12, a second spacing bar 14 extending from the coil 13, a second bearing coil 15 upon the spacing bar 14, a third spacing bar 16 extending from the coil 15, an arm 17 extending at right angles to the bar 16 and a ring 18 connected to the outer end of the bar 17 in a transverse plane.

The spacing bar 12 is considerably longer than the spacing bar 5 so as to separate the finger loop 11 from the finger loops 3 and 4. The spacing bar 5 extends slidingly through the coil 13. The spacing bar 14 extends slidingly through the coils 6 and 8 and the prong 9 extends slidingly through the coil 15 and the ring 18 loosely encircles the prong 9.

The members 1 and 2 reciprocate relative to each other. When the finger loop 11 is pulled away from the loops 3 and 4, the coil 15 will strike the coil 8 to limit the movement in that direction and the prong 9 will project beyond the ring 18. A piece of poisoned bait 19 may be placed upon the prong 9 against the ring 18 and then the device may be inserted into a gopher hole 20 or the like until the bait 19 reaches a desired position in the hole and then the loops 3 and 4 are moved towards the loop 11, thereby withdrawing the prong 9 from the bait and the ring 18 serves to push the bait from the prong or to hold the bait while the prong is withdrawn.

When the loops 3 and 4 are moved towards the loop 11 the bearing 13 will strike the bearing 6 and limit the movement in that direction. The members 1 and 2 are flexible so they may be inserted into a crooked hole as indicated in Fig. 1 and in the same manner bait may be placed in rat holes and in other places where rodents may find it.

Various changes may be made without departing from the spirit of my invention as claimed.

I claim:

1. A baiting device for rodents comprising two members formed of wire, one member having a prong for penetrating the bait and carrying the bait, and the other member having a stop to engage the bait so that when the members are reciprocated the prong is withdrawn from the bait to leave the bait in place.

2. A baiting device for rodents comprising two members formed of wire, the wires being bent to connect the members in parallel positions so that the members will reciprocate and to form stops to limit the reciprocation, one member having a prong for carrying bait and the other member having means for holding the bait while the prong is withdrawn.

3. A baiting device for rodents comprising two members formed of wire, each member having one or more finger loops, each wire being bent to form bearings for the other wire and the bearings upon one wire serving as stops for the bearings upon the other wire, one member having a prong for carrying bait and the other member having a ring to hold the bait while the prong is withdrawn.

In testimony whereof I have signed my name to this specification.

CHARLES J. BARNES.